United States Patent [19]
Newbanks

[11] Patent Number: 5,355,620
[45] Date of Patent: Oct. 18, 1994

[54] VACUUM-INFUSION SYSTEM FOR TREE INJECTION

[76] Inventor: Dennis Newbanks, 161 Beech Ridge Rd., York, Me. 03909

[21] Appl. No.: 911,011

[22] Filed: Jul. 9, 1992

[51] Int. Cl.$^5$ .............................................. A01G 29/00
[52] U.S. Cl. ......................................... 47/58; 47/57.5
[58] Field of Search ...................... 47/57.5, 48.5, 40.5, 47/58

[56] References Cited

U.S. PATENT DOCUMENTS 1,718,195  6/1929  Rankin ................................... 47/57.5

FOREIGN PATENT DOCUMENTS 64306   11/1955  France .................................. 47/57.5
316637  10/1956  Switzerland ........................... 47/57.5

OTHER PUBLICATIONS

Costonics, A. C. 1980. The wounding effects of mauget and creative sales injections. Journal of Arboriculture 6(8):204–208.

Ellmore, G. S., W. E. Phair, C. Gill, and Skinner. 1991. Fluid delivery in injected ring-porous trees. Proceedings: Second Symposium on Systemic Chemical Treatments in tree culture, K. B. Miller Ed., Michigan State University, East Lansing, pp. 32–42.

Fuchs, A. D. 1988. A comparison of three different truck injection systems for use with plant growth regulators. Journal of Arboriculture 14(4):94–98.

Holmes, F. W. 1982. Distribution of dye in elms after trunk or root injection. Journal of Arboriculture 8:250–252.

Miller, K. B. 1991. Ed., Proceedings: Second Symposium on Systemic Chemical Treatments in Tree Culture, Michigan State University, East Lansing, 170 pg.

New Banks, D., D. N. Roy, and M. H. Zimmerman. 1982. Dutch elm disease:What an arborist should know. Arnoldia 53:60–69.

Simmons, M. and P. Gerstenberger. 1991. Systemic Tree Treatment. Tree Care Industry 2(11):4–13.

Stipes, R. J. 1991. Glitches and gaps in the science and technology of tree injection. In: Proceedings, Second Symposium on systemic chemical treatments in tree culture, K. B. Miller, Ed. Michigan State University, East Lansing, pp. 17–27.

Zimmerman, M. H. 1983. Xylem Structure and the Ascent of Sap. Springer-Verlag, New York.

Zimmerman, M. H. and C. L. Brown. 1971. Trees: Structure and Function. Springer-Verlag, New York.

Advertisements: Tree Care Industry, vol. 2, No. 11, Systemic Tree Treatment.

Tree Technology Systems, Inc., The New Standard for Microinjection. Creative Sales, Inc.: Easy-to-Apply Encapsulated Implants that work systemically inside the tree.

Journal of Arboriculture, Apr. 88, vol. 14, No. 4. Additional References: Stipes, R. Jay, Campana, Richard J. Compendium of Elm Diseases, pp. 19.

J. J. Mauget Co., Inc., Mauget Micro-Injection System Sinclair, W. A. and Larsen, A. O. Wood Characteristics related to "injectability" of trees. pp. 6–10.

Himelick, E. B. and Himelich, Kirk J.. Treatment for Chlorosis. Systemic Treatment for Chlorotic Trees. pp. 192–196.

(List continued on next page.)

Primary Examiner—Henry E. Raduazo
Attorney, Agent, or Firm—McCormick, Paulding & Huber

[57] ABSTRACT

A vacuum infusion system and method provides for the introduction of desired chemical or treatment fluid directly into functional water conducting elements of a tree without the introduction of air and the subsequent embolization and dysfunction of part of the trees normal transpirational stream. With the present system and method, an orificed-needle is passed through a previously evacuated chamber containing a liquid medium which has been degassed. The insertion of the orificed-needle through this degassed liquid prevents the introduction of air into the tree while the treatment fluid is being pulled into the tree's transpirational stream by the normal xylem tension.

9 Claims, 2 Drawing Sheets

OTHER PUBLICATIONS

Roberts, Bruce R.. Advances in Tree Growth Control by Trunk Injection. Mar. 1990. vol. 6, No. 3. Journal of Arboriculture.

Domir, Subshas C. and Roberts, Bruce R. Trunk Injection of Plant Growth Regulators to control tree regrowth. Journal of Arboriculture. Jun. 1991. vol. 7, No. 6 pp. 141–144.

Murdoch, C. W., Coleman, J. S. and Campana R. J.. Bark Cracks Associated with Injection Wounds in Elms. Journal of Arboriculture. Mar. 1983. vol. 9, No. 3. pp. 61–64.

Worley, Ray E., Littrell R. L. and Dutcher, J. D. A Comparison of Tree Trunk Injection and Implantation of Zinc Capsules for Correction of Zinc Deficiency. Journal of Arboriculture. Oct. 1980. vol. 6, No. 10. pp. 253–257.

Dutcher, J. D., Worley, R. W. and Littrell R. H. Trunk Injection of Dicrotophos and Trunk Implantation of Acephate to Control Foliar Pecan Pests. pp. 294–297.

Sachs, R. M., Campidonica, M., Steffen, J., Hodel D. and Jauniaux, M.-P. Chemical Control of Tree Growth by Barking Painting. pp. 284–291.

VACUUM-INFUSION SYSTEM FOR TREE INJECTION

TECHNICAL FIELD

This invention relates to arboriculture generally, and more particularly to systems for injection of liquids into trees.

BACKGROUND OF THE INVENTION

In the tree care industry or field of arboriculture, the treatment of trees with therapeutic and prophylactic chemicals is commonly used to control tree disease and insect problems, as well as for the purpose of tree fertilization and growth control. The most environmentally sound and economically feasible approach to such chemical applications in trees is to inject, infuse, or implant the chemical directly into the tree. Various techniques are currently being used for both commercial and research application of the injection, infusion, and implantation methods. All of these methods require the physical wounding of the tree, usually by drilling a hole into the trunk, and the subsequent, inadvertent introduction of air into the xylem or water conducting elements of the tree.

The concept of injecting trees, and plants in general, is not a new one, with a report of tree injection by Leonardo da Vinci in the 12th century. In more modern times the practice of injecting trees with therapeutic and prophylactic chemicals has become quite common. In the tree care and agricultural industries there exists a wide interest in tree injection systems and methods, and numerous professional and scientific journals are common forums for methodology and applications of such systems.

Prior art "tree Injection" in its widest sense can include a wide range of methodology and purposes relating to the injection, infusion, or implantation of chemicals into trees. Injection, in its truest sense refers to the "pressure injection" or the introduction of chemicals under pressure greater than atmospheric pressure. Infusion has been used to refer to a more passive introduction of chemicals into trees; that is to inject by the force of gravity and atmospheric pressure without additional applied pressure. Implantation, is the insertion of a chemical, in solid form, into a holed drilled in the tree.

The most common practice or technique used to inject trees is to drill a hole into the trunk of the tree and then attach one or more adaptors through which the chemical can be introduced into the tree by injection or infusion. Injections are also made through drill wounds in the root and root-trunk flare area of trees. Injection wounds have also been made using a "shallow-pit" technique, and by an "insertion-tool technique". All of these injection methods employ wounding of the tree and subsequent introduction of air into the water conduction system of the tree.

The physiology of water movement in trees is well presented in the literature, and the adverse effect which trunk wounding and embolization has on the water conduction in trees is known. The inadvertent introduction of air into the tree's water conduction system, during tree injections, has long been recognized as an impairment to systemic distribution of chemicals in diseased trees, and limited, systemic chemical distribution is widely considered to be the greatest hindrance to effective disease control in trees. The need to improve systemic chemical distribution has been recognized and it has been suggested that the removal of air from injection wounds by vacuum infiltration techniques as one method that has reasonable potential to improve systemic distribution of injected chemicals in trees. To date, there is no evidence of commercial or research applications of such techniques in the professional and scientific literature.

In normal tree function, water is supplied to the leaves by the roots through the transpirational stream which is comprised of the xylem or water conducting elements of the trunk and branches. The mechanism for water movement is through a tension or negative pressure system based on the molecular adhesion of water molecules. As water is evaporated from the leaf surfaces, the tension created by molecular bonds pulls water molecules from the transpirational stream to replace them. This system pulls water, molecule by molecule from the root system to the leaves creating a tension or negative pressure gradient. This transpirational pull can create tensions within the conducting elements as low as $-30$ atmospheres; with $-5$ to $-20$ atmospheres being common during the summer months. As is known to those skilled in the art, these pressure measurements correspond to the values of positive pressures needed to cause reverse transpiration of water. That is, the tension is the negative of the value of pressure needed to be applied to the leaf to urge water through a cut portion of the stem. For example, a tension of $-5$ atmospheres is obtained in a leaf which requires 5 atmospheres of positive pressure to urge a drop of water from its stem.

The systemic tree treatment systems and methods currently in commercial and research use cause the introduction of air into the transpirational stream of the tree, thereby embolizing the conducting elements and breaking the water columns necessary for systemic movement of compounds within a tree. In effect, the methods employed by these known systems disrupt and render dysfunctional the very water-conducting elements necessary for the must efficient and effective systemic movement within trees.

SUMMARY OF INVENTION

An object of the present invention is to provide for a system and method for infusing liquid into a tree that does not disrupt the normal negative pressure gradient within the tree.

Another object of the present invention is to provide a system and method of the foregoing type that does not introduce air into a tree's transpirational system.

Still another object of the present invention is to provide a system of the foregoing type that allows for degassing of the liquid prior to infusion into the tree.

According to the present invention a system for infusing liquid from a reservoir into a living tree through an exterior tree surface includes an infusion housing that has an interior vacuum chamber. A hollow needle is positioned within a portion of the chamber. The needle has an interior longitudinal cavity with an opening through a needle tip and an opening through a needle exterior wall capable of communicating with the chamber. Also included is a displacement apparatus for advancing the needle from a first, withdrawn position to a second position extending beyond the infusion housing. A sealing interface is attached to the infusion housing about said needle for conformably adapting to a portion of the tree surface to maintain a vacuum within the chamber. A valve is provided with a plurality of ports for selectably enabling the chamber to communicate with an evacuation apparatus for evacuating air from the chamber and alternatively for selectably enabling the liquid to flow to the chamber.

According to another aspect of the present invention, a method of infusing liquid from a reservoir into a living tree having a layer of xylem through an exterior tree surface includes the steps of establishing a vacuum seal between an infusion housing and a portion of the exterior tree surface; evacuating an interior chamber of the infusion housing; supplying said liquid to the chamber, degassing the liquid, and advancing a hollow needle into the tree a distance sufficient to communicate with the xylem, thereby enabling the infusion of the liquid into the tree through an opening at the needle tip and an opening in a needle wall communicating with the liquid in the chamber.

DETAILED DESCRIPTION OF PREFERRED EMBODIMENT

Figure 1:
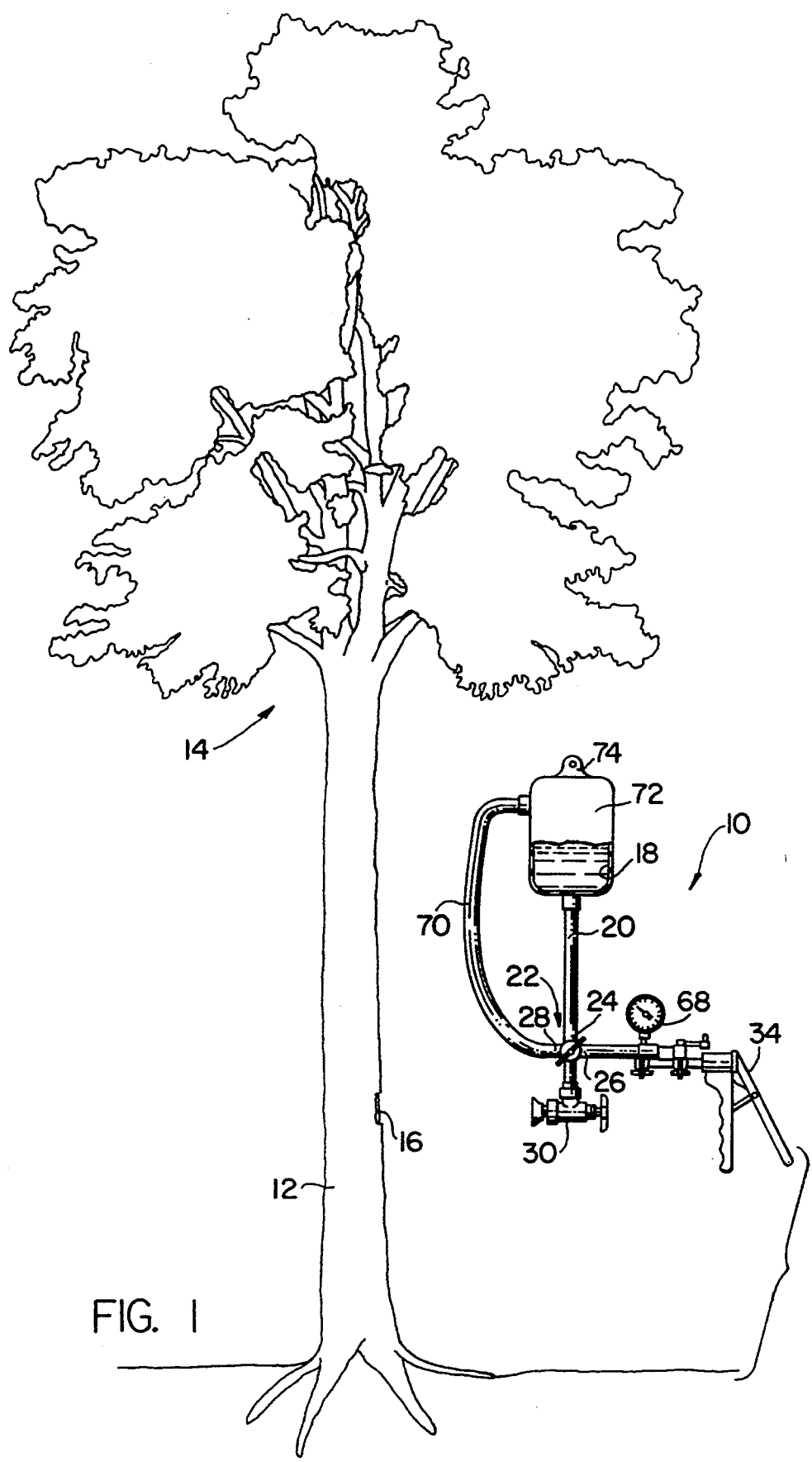
FIG. 1 is a simplified schematic illustration of a vacuum infusion system as provided in accordance with the present invention.

Referring now to FIG. 1 there is shown a vacuum infusion system 10 provided according to the present invention. The present system is preferably positioned against a portion of a trunk 12 of a tree 14. In certain applications bark must be shaved from an area 16 in order to assure that the present system can be configured against the tree with an interior portion maintained under vacuum.

A reservoir 18 contains liquid treatment such as medicine and/or nutrients which are to be provided to the tree. The reservoir is preferably collapsible, and has connecting tubing 20 (e.g., clear flexible TYGON tubing) which is provided to a valve 22 having a plurality of ports 24, 26 and 28. An infusion housing 30 is directly configured with valve port 32. A pump 34 is used to generate a vacuum in an interior chamber of the housing as detailed hereinafter.

Figure 2:
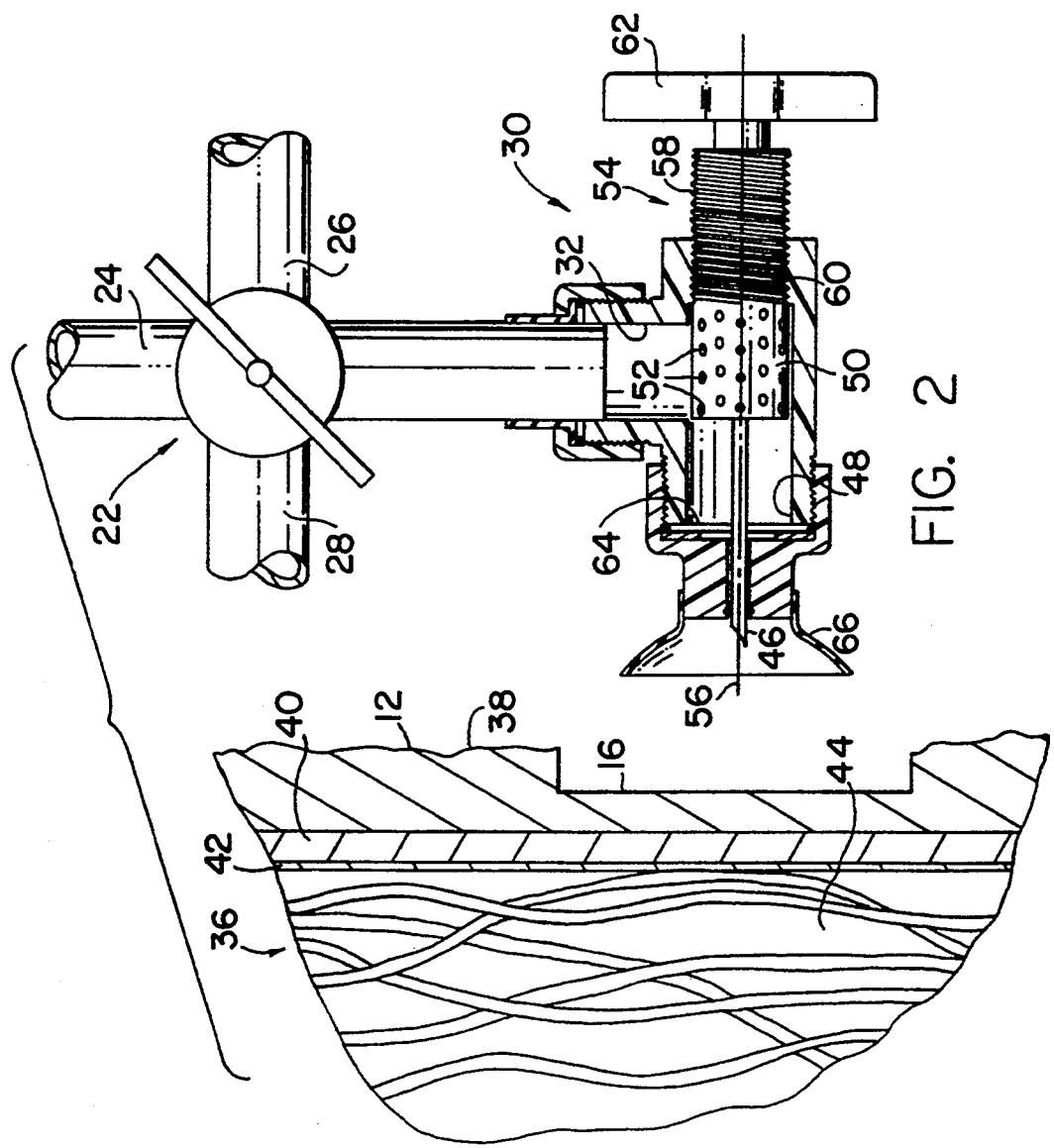
FIG. 2 is a more detailed sectional view of the system of FIG. 1.

FIG. 2 is a sectional illustration showing in more detail an interior portion 36 of the tree. As is known, a tree includes outer bark 38 comprising dead phloem and a living phloem layer 40 interior to the bark for the transport of nutrients down to the root system. A single cell thick cambium layer 42 lies interior to the phloem, with water conducting xylem 44 located still further inside. The xylem conduct water from the roots to the leaves in the tree crown.

As set forth hereinabove, the xylem comprise part of the tree's transpirational system which is under tension. The prior art devices drill an open hole into the side of the tree and attempt to force the nutrients into the tree under positive pressure. The open hole breaks the tension or negative pressure gradient within the tree. The additional pressure actually traps the introduced air preventing the refilling of the embolized vessels from the surrounding tissue and thus opposes the operation of the tree's natural system. Severe local disruption of the normal movement of water within the tree is the result. With the present system, nutrients are supplied to the tree under vacuum, without disruption of the normal water conducting xylem.

The infusion housing includes an orificed-needle 46 for providing the liquid to the tree and is located at a bottom portion of an interior chamber 48. The needle is hollow and has an interior cavity with openings at the needle tip and an interior end. The needle is affixed to a manifold 50 that comprises a plurality of openings 52 allowing for the passage of fluid from the chamber to the needle tip and ultimately to the tree interior. An advancement apparatus 54 is used to advance the needle-manifold assembly along a displacement axis 56 between a retracted position and a position with the needle extended from the housing. The advancement apparatus preferably comprises a threaded shaft 58 received by a correspondingly threaded bore 60. The shaft is affixed to the manifold and is turned manually by handle 62. To maintain the integrity of the vacuum, the present system is configured with "O" rings and/or equivalent sealing devices, such as "O" ring 64.

A suction cup 66 of appropriate size and construction is used as an interface between the housing and tree to maintain a vacuum within the system. The suction cup is positioned about the needle and additionally acts to secure the system against the tree. Those skilled in the art will note that different trees and applications may require additional measures, such as the application of vacuum grease to the bark.

In operation, the infusion housing is positioned against the shaved bark area 16. The surface need not to be shaved or otherwise prepared if an adequate vacuum seal can be obtained. The valve is positioned such that the housing chamber and needle-manifold assembly can be pumped down to a vacuum pressure of 2 to 28 inches of mercury. As shown in FIG. 1, the pump can be a simple hand held unit with the pressure indicated by gauge 68.

Once the infusion system has been placed under vacuum, the valve is adjusted so that the liquid treatment is degassed under an equivalent vacuum. This process is preferably accomplished by applying a vacuum to the treatment reservoir by means of tubing 70 opening to an upper portion 72 of the treatment reservoir containing air. The degassing process typically takes about 5 minutes and removes any residual air which would otherwise come out of solution when drawn into the tree. The preferred vacuum is in the range of 2" to 28" of mercury. For certain applications it may be necessary to include additional means for supporting the housing and or the reservoir. In the preferred embodiment the reservoir is provided with an eyelet 74 to allow the system to be suspended during the infusion process.

Once the liquid treatment has been degassed, the needle is advanced through the interior of the tree approximately ½ to 2 centimeters such that the needle lies within the xylem. The depth to which the needle must be inserted is on the order of 3 to 20 millimeters. Those skilled in the art will appreciate that the exact depth is variable, but need only to be sufficient to present the needle tip to the xylem. However it is most important to avoid the introduction of air into the water conducting xylem. At this point the liquid treatment will be provided by the chamber and subsequently drawn into the interior of the tree without disruption of the water columns.

A systemic tree treatment system provided according to the present invention avoids the large scale tree wounding and its subsequent introduction of air into the xylem or water conducting elements of the tree. The present system provides for the introduction of the desired chemical or treatment fluid directly into functional, water conducting elements of a tree without the introduction of air and the subsequent embolization and dysfunction of the trees normal transpirational stream. The insertion of the orificed-needle through a vacuum-degassed medium prevents the introduction of air into the tree while the treatment fluid is being pulled into the tree's transpirational stream by the normal xylem tension.

Similarly, although the invention has been shown and described with respect to a preferred embodiment thereof, it should be understood by those skilled in the art that various other changes, omissions and additions thereto may be made therein without departing from the spirit and scope of the present invention. For example, the present system may be readily adapted for use with plants characterized by different internal anatomy and pressure gradient to infuse liquids along a stem portion of the plant.

I claim:

1. A method of infusing liquid into a living plant having a layer of xylem through an exterior plant surface, said method comprising the steps of:

establishing a seal between an infusion housing and a portion of the exterior plant surface to prevent the passage of air between the infusion housing and the exterior plant surface;

supplying said liquid to a chamber coupled to said infusion housing, and degassing said liquid introduced into said chamber by evacuating said chamber to a negative pressure;

forming a liquid passageway in the plant extending between the xylem and the exterior plant surface and introducing liquid from said chamber through said liquid passageway into said xylem.

2. The method of claim 1 wherein said degassing step includes evacuating said chamber to a negative pressure of between approximately 2 and 28 inches of mercury.

3. The method of claim 1 further comprising the step of evacuating an upper portion of said chamber containing air to degas said liquid.

4. The method as defined in claim 1, wherein the step of forming a liquid passageway in the plant includes advancing an injection member through the exterior plant surface a distance sufficient to communicate with the xylem, said injection member defining an orifice coupled in fluid communication with said chamber, and introducing said liquid through said orifice of said injection member and into the xylem.

5. A method of infusing a liquid solution into a living plant having an exterior plant surface and a layer of xylem inside the plant relative to the exterior plant surface, comprising the steps of:

introducing the liquid solution into a chamber, and degassing the liquid solution introduced into the chamber by evacuating the chamber to a negative pressure;

forming a liquid channel in the plant extending between the exterior plant surface and the xylem;

introducing the degassed liquid solution through the liquid channel and into the xylem; and preventing the passage of ambient air into the xylem upon passage of the degassed liquid solution through the liquid channel into the xylem.

6. A method as defined in claim 5, further comprising the steps of forming a liquid channel in the plant by advancing an injection member coupled in fluid communication with the liquid in the chamber into the xylem, and introducing the degassed liquid solution through the injection member into the xylem.

7. A method as defined in claim 6, wherein a free end of the injection member is inserted at least approximately ½ centimeter into the xylem.

8. A method as defined in claim 5, wherein the living plant is a woody perennial plant.

9. A method as defined in claim 5, wherein the step of preventing the passage of ambient air into the xylum includes surrounding the liquid channel defined in the exterior plant surface with a sealing member and engaging the sealing member against a surface of the plant to prevent the passage of ambient air between the sealing member and the surface of the plant.

* * * * *